United States Patent [19]  [11] 3,981,853
Manwiller  [45] Sept. 21, 1976

[54] POLYTETRAFLUOROETHYLENE MOLDING POWDER FROM POLYTETRAFLUOROETHYLENE FINE POWDER

[75] Inventor: Carl Harding Manwiller, Wilmington, Del.

[73] Assignee: E. I. Du Pont de Nemours and Comany, Wilmington, Del.

[22] Filed: June 17, 1974

[21] Appl. No.: 480,143

[52] U.S. Cl. .................................. 526/255; 528/502
[51] Int. Cl.$^2$ ................ C08F 114/26; C08F 214/26
[58] Field of Search .............................. 260/92.1 S

[56] References Cited
UNITED STATES PATENTS

| | | | |
|---|---|---|---|
| 2,573,639 | 10/1951 | Coler | 260/92.1 S |
| 3,087,921 | 4/1963 | Mathews et al. | 260/92.1 S |
| 3,674,762 | 4/1972 | Izumo et al. | 260/92.1 S |
| 3,690,569 | 9/1972 | Leverett | 260/92.1 S |

OTHER PUBLICATIONS

Japanese Patent Publication 17460/73, (publication date May 29, 1973), Ukihashi, et al.

*Primary Examiner*—Harry Wong, Jr.

[57] ABSTRACT

Polytetrafluoroethylene fine powder is compacted at or near room temperature at a pressure of 8000 psi (562 kg/cm$^2$) to 50,000 psi (3513 kg/cm$^2$), followed by partially decompacting the resultant compacted fine powder to a molding powder having an average particle diameter of less than 100 microns.

6 Claims, No Drawings

POLYTETRAFLUOROETHYLENE MOLDING POWDER FROM POLYTETRAFLUOROETHYLENE FINE POWDER

THE INVENTION

This invention relates to polytetrafluoroethylene molding powder from polytetrafluoroethylene fine powder.

PRIOR ART

Two general types of polytetrafluoroethylene (PTFE) are available, the granular type, usually called molding powder, and the fine powder type which is obtained from aqueous dispersion polymerization. Both types are made by pressuring tetrafluoroethylene into a stirred aqueous solution of free radical polymerization initiator, under polymerizing conditions. In aqueous dispersion polymerization, the stirring is slow enough and sufficient dispersing agent is present that the PTFE is obtained in the form of colloidal-size particles less than one micron in diameter, which remain dispersed in the aqueous medium when polymerization is stopped. Upon coagulation of the particles and drying, the fine powder type of PTFE is obtained.

In granular polymerization, the stirring (or agitation) is sufficiently rapid to cause coagulation of the polymer particles during the polymerization. Dispersing agent is generally not present except perhaps in smaller than dispersion-stabilizing amounts for the different purpose disclosed in U.S. Pat. No. 3,245,972 to Anderson et al. When polymerization is stopped, the resultant granular polymer is in the form of relatively coarse particles, some 1000 microns in diameter and larger. Normally, this polymer is subjected to coarse or fine grinding to provide the molding powders commercially available.

These two different types of PTFE have quite different and mutually exclusive molding characteristics. PTFE fine powder is fabricated by blending with an oil lubrication aid in about an 80:20 parts by weight proportion and the resultant pasty mass is extruded, generally at room temperature, this process being called paste extrusion. PTFE molding powder is fabricated by (a) pressing in a mold, followed by sintering of the resultant preform without application of pressure, or (b) ram extrusion, which involves ramming the powder through a heated orifice, which sinters the powder under pressure. PTFE fine powder is not fabricable except as small moldings (generally less than 30 grams) by the preform/free sinter technique, or by ram extrusion, and conversely, PTFE molding powder is not paste extrudable.

Because of the different polymerization techniques involved in making the two types of PTFE and their different methods of fabrication leading generally to the application of these types in different fields, the technology of these two types has been separate and independent from one another. An exception to this is U.S. Pat. No. 3,087,921 to Mathews and Roberts, which discloses the making of PTFE molding powder having good handling characteristics and high apparent density by subjecting either a previously available PTFE molding powder or PTFE fine powder to the steps of (a) compacting the PTFE to a density of at least 2.15 g/cc at pressing conditions of 50° to 300°C. and pressures of 1000 psi (70 kg/cm² to 3000 psi (211 kg/cm²), (b) cooling the compacted polymer, and (c) comminuting the cooled, compacted polymer to particles having an average particle diameter of smaller than 1000 microns and preferably from 200 to 500 microns (the wet sieve $d_{50}$ particle size of 350 to 650 microns for uncompacted PTFE fine powder is the particle size of the loose agglomerates formed by coagulating the colloidal size polymer particles). While this treatment increases the powder flow for the PTFE fine powder from an essentially no-flow condition to 17 g/sec and increases apparent density from 400 to 600 g/l to 800 to 1000 g/l, the tensile strength of the PTFE molding powder made from the PTFE fine powder is only 1650 psi (116 kg/cm²), which is poor at best, especially as compared to the minimum tensile strength of 4000 psi (280 kg/cm²) for ASTM Type IV, which is the highest quality PTFE molding powder.

THE PRESENT INVENTION

The present invention provides a high quality polytetrafluoroethylene molding powder which is obtained from PTFE fine powder by compacting the fine powder at a temperature of about 20° to 30°C. and pressure of 8000 psi (562 kg/cm²) to 50,000 psi (3513 kg/cm²) and partially decompacting the resultant compact to a molding powder having an average particle diameter of less than 100 microns. The resultant molding powder is no longer moldable by the fine powder technique but is moldable by the molding powder techniques.

Preferably the particular compaction and decompaction conditions are selected so that the resultant molding powder has the combination of high moldability and high apparent density, as evidenced by an apparent density of at least 500 g/l and related to moldability by the following equation:

1. Apparent density $\geq 500 + 3.00\,(\Delta\,SG_{5\text{-}1})$ wherein $\Delta\,SG_{5\text{-}1}$ is 1000 times the difference in specific gravities of the sintered molding made at preform pressures of 1000 psi (70 kg/cm²) and 5000 psi (352 kg/cm²) (the procedure for determining $\Delta SG_{5\text{-}1}$ is described further hereinafter) wherein $\Delta SG_{5\text{-}1}$ is no greater than 75. Preferably, the apparent density of the molding powder is at least 600 g/l, and the apparent density/moldability relationship of the molding powder is defined by equation (1) wherein "500" therein is replaced by "600". Theoretically, the maximum apparent density of the molding powder that could be obtained if the particles thereof were spheres of different size to give a maximum packing density, would be 1942 g/l.

The larger the difference between the specific gravity values at 70 kg/cm² and 352 kg/cm², or in other words the higher the $\Delta SG_{5\text{-}1}$ value, the more voidy would be the sintered part made from the low pressure preform. This voidiness would result in reduced tensile and dielectric strength and thus poor quality of the sintered article. In commercial practice, voidy articles can often be prevented by the use of high preform pressures but this requires more massive, and thus more expensive, preforming equipment.

Thus, the lower the $\Delta SG_{5\text{-}1}$, the lower is the voidiness and the better is the quality of the sintered article. Low $\Delta SG_{5\text{-}1}$ values are thus indicative of high quality moldings made from the molding powder, or in other words, high moldability. The $\Delta SG_{5\text{-}1}$ value is also referred to herein as moldability index (at 5-1 unless otherwise indicated). A preferred moldability index for the molding powders is no greater than 60.

The low moldability indexes exhibited by these molding powders in combination with their small particle size correspond to high tensile strengths for objects made therefrom, having a tensile strength of at least 3500 psi (245 kg/cm$^2$) and preferably at least 4000 psi (280 kg/cm$^2$). The standard tensile strength test is done on sintered objects molded at 5000 psi (352 kg/cm$^2$) preform pressure. The low moldability indexes for the molding powders made in the present invention enables these tensile strengths to be achieved at only 1000 psi (70 kg/cm$^2$) preform pressures.

By way of comparison, the moldability index of the Mathews and Roberts molding powder which is made from densified granular polymer and which has a higher tensile strength than the molding powder made from densified dispersion polymer (2150 psi v. 1650 psi) is 89 as reported in comparative Example 8 of Roberts and Anderson, U.S. Pat. No. 3,766,133. This high moldability index is obtained from the difference between specific gravities at preform pressures which are closer together, viz. 2000 psi and 5000 psi, than the test used in the present invention. At the preform pressures of 1000 psi and 5000 psi used in the present invention, the moldability index of the Mathews and Roberts product would be much higher than 89. To illustrate, the lowest moldability index value reported for a high apparent density molding powder (565 g/l) in U.S. Pat. No. 3,245,972 to Anderson, Edens, and Larson is 15, based on specific gravities taken on samples made at 2000 and 5000 psi preform pressure ($\Delta SG_{5-2}$). At preform pressures of 1000 and 5000 psi, this moldability index (of 15) increases to about 75. A molding powder made by the present invention that has a moldability index (5-1) of 75 has an extremely high and desirable apparent density of at least 700 g/l.

The PTFE fine powder starting material used in the present process is known in the art, disclosed for example in the aforementioned Mathews and Roberts patent and in greater detail in U.S. Pat. No. 2,559,752 to Berry. This type of PTFE is used in the coagulated form, often called "fine powder".

The first step in the conversion of this coagulated aqueous dispersion PTFE to molding powder is to compact this PTFE under high pressure at about room temperature, e.g., 20° to 30°C., in a pressure device, such as a molding press or compacting rolls. Pressures ranging from 8000 psi (562 kg/cm$^2$) to 50,000 psi (3513 kg/cm$^2$) are used. The coagulated aqueous dispersion PTFE can be wet at the time of compaction, i.e., still contain some of the aqueous polymerization medium therein, or can by dry.

The second step is to break up, i.e., partially decompact, the compact into particles having an average diameter less than 100 microns. Although this decompacting is not considered grinding because the colloidal-size particles (diameter less than 0.5 micron) making up the compact are already much smaller than the particles resulting from decompacting, conventional grinding equipment can be used to do the decompacting. Such equipment includes high speed cutter mills run in a liquid, usually water, such as the "Taylor Stiles Giant Mill" (Taylor Stiles Co.), which decompact in water; and fluid energy mills, such as a "Micronizer" (Sturtevant Mill Co.), which decompact the compact in the dry state, i.e., in a gas instead of a liquid, and the gas is usually air. Prior to feeding the compact to such mills, it may have to be broken into relatively coarse chunks of a size which can be fed to the mill. If wet milling is done, this is followed by drying. The resultant partially decompacted material is the molding powder of the present invention. Because the decompaction does not reduce the PTFE particles to their original fine powder particle size, the decompaction step is considered to involve partial decompaction only.

The molding powder prepared by this route of compaction and decompaction of the fine powder type of PTFE is distinguished from the starting fine powder in several ways. First, the molding powder has a preform porosity at a preform pressure of 1000 psi (70 kg/cm$^2$) of no greater than 0.20 and preferably less than 0.17. In fact, many molding powders obtained from this route have a porosity below 0.15, showing excellent low pressure preformability. In contrast, the fine powder starting materials have a porosity well above 0.20, indicating poor low pressure preformability. The significance of this difference in porosity values is that while the fine powder is not sinterable to massive articles without cracking, the molding powder obtained therefrom by the present invention is sinterable without cracking. Second, mold shrinkage at 1000 psi preform pressure (% S (1000)) of the fine powder starting material is greater than 8.0, while % S (1000) of the product of the process is less than 8.0 and preferably no greater than 7.2. This lower shrinkage is an advantage in that it is less difficult to design a mold to make a product of a given size. Third, mold shrinkage at 5000 psi preform pressure (% S (5000)) of fine powder will be substantially reduced in the molding powder made therefrom. Generally, the % S (5000) of fine powder is greater than 3.7, and the molding powder obtained therefrom has a % S (5000) of no greater than 3.7. Finally, the molding powder is moldable by molding powder techniques, while fine powder tends to stick to the mold and to crack on preforming or sintering.

Typical molding powder derived from fine powder by the present process as described hereinbefore has been molded extensively, the results indicating that typical molding powder is comparable to a high quality finely ground granular PTFE and in some respects superior in terms of having both high apparent density and high moldability.

Other high performance fine ground PTFE molding powders made from PTFE granular polymer, prior to the present invention, have the following combination of density and $\Delta SG_{5-1}$:

|   |   | Apparent density g/l | $\Delta SG_{5-1}$ |
|---|---|---|---|
| A. | "Algoflon" F-2 (Montecatini Edison) | 390 | 5 |
| B. | "Hostaflon" TF-17 (Farbwerke Hoechst) | 375 | 2 |
| C. | "Polyflon" M 12 (Daikin Kogyo) | 385 | 7 |
| D. | "Fluon" G 163 (I.C.I.) | 375 | 5 |
| E. | "Halon" G-80 (Allied Chemical, U.S. Pat. No. 3,640,984) | 380 | 13 |
| F. | "Teflon" 7A (Du Pont) | 480 | 40 |
| G. | "Teflon" 7B (Du Pont) | 370 | 16 |
| H. | Example 1, U.S. Pat. No. 3,690,569 | 517 | 42 |
| I. | Sample g of Example 4 of U.S. Pat. No. 3,690,569 | 519 | 22 |

From this data, it can be seen that prior molding powders have an apparent density that is less than would be calculable from equation (1) for the moldabilities set forth in the above tabulation. For example, a molding powder prepared in the present invention having a moldability index of 42 would have an apparent density of at least 636 g/l (500 + (3 × 42)) instead of only 517 for powder H. In fact, all the above tabulated molding powders, except powder I, have an apparent density equal to or less than calculable from equation (1) wherein "500" is replaced by "400". Powder I is considered undesirable in the reference describing it.

Commercial fine powder PTFE is not suitable for molding by preforming and sintering because it sticks to the mold and cracks badly. Hundreds of 5.72 cm, 7.62 cm, and 10.15 cm diameter cylinders have been made from the molding powder prepared in the present invention, and no mold sticking has been observed. The resultant sintered cylinders, including the 10.15 cm cylinders (weighing 0.908 kg), have been just as crack-free as controls made from high quality finely ground PTFE molding powder made from granular resin available heretofore. No cracks were found in 5.72 cm or 7.62 cm cylinders.

Moldings made from the molding powder derived from fine powder have a very smooth surface, and tape skived from these moldings has a uniform void-free appearance. This molding powder sinters to a clear, transparent, self-supporting melt, whereas finely-ground granular resin available heretofore gives a cloudy melt. A clear melt is advantageous, because the user can look in the oven and see whether sintering is complete, i.e., the melt is clear, after which the cooling cycle can be started. The high quality of the skived tapes is illustrated by their having a dielectric strength in excess of 1800 volts/mil (700 kv/cm) on 5 mil (127 micron) thick samples prepared as described below.

To illustrate the good mechanical and electrical properties of a molding powder prepared in the present invention from fine powder, the molding powder has a tensile strength of 4550 psi (320 kg/cm$^2$), an elongation of 320% and a dielectric strength of 1880 volts/mil (740 kv/cm), measured on 5 mil (127 micron) tape skived from 5.72 cm diameter solid billets sintered for 5 hours at 380°C and cooled at 2–3°C/minute. Elongation and dielectric strength compare with side-by-side controls of other representative PTFE molding powders as follows:

| Resin | Elongation % | Dielectric strength kv/cm |
|---|---|---|
| Typical molding powder of this invention derived from fine powder | 320 | 740 |
| Representative commercial finely ground molding powder | | |
| A  Molding Powder E | 285 | 729 |
| B  Molding Powder F | 280 | 828 |

Preforming of the billet was done at 176 kg/cm$^2$. When the preform pressure was only 70 kg/cm$^2$, the molding powder still gave a dielectric strength superior to that of commercially available finely ground molding powder, owing to the improved physical uniformity (lack of voids) of the tape. Specifically, at 70 kg/cm$^2$ preform pressure, 5-mil (127 micron) thick tape skived from the sintered preform of molding powder prepared in the present invention exhibited a dielectric strength of 768 k volts/cm, as compared to only 433 kv/cm for molding powder B and 295 kv/cm for molding powder A above.

The molding powders prepared in the present invention have somewhat better flowability (powder flow) than the fine ground resin of U.S. Pat. No. 2,936,301 to Thomas and Wallace. Powder flow can be further improved to form a free-flowing molding powder by forming agglomerates of the molding powder, e.g., average agglomerate diameter of 300 to 1000 microns, using water, an organic wetting liquid, or an immiscible mixture thereof as agglomeration media.

The molding powders prepared in the present invention in the preferred sense have a moldability index ($\Delta SG_{5-1}$) of no greater than 30 and an average particle diameter of no greater than 60 microns. Preferably, the molding powder prepared in the present invention has an average particle diameter of at least 10 microns produced by the partial decompaction step.

The molding powders prepared in the present invention consist of high molecular weight PTFE, which means that these molding powders are fabricable by the non-melt fabrication processes used on the conventional PTFE molding powders. One measure of high molecular weight is these molding powders have an apparent melt viscosity of at least $1 \times 10^9$ poises at 380°C.

The PTFE from which the molding powder is made can also contain a small proportion of fluorinated terminally unsaturated comonomer content, e.g., 0.01 to 0.5% based on the total weight of the copolymer. Preferred comonomers are the perfluoroalkenes and perfluoro(alkyl vinuyl ethers), each containing 3 to 8 carbon atoms. The comonomer contributes high toughness and high flex life to the molding powder.

Test results reported herein are determined according to the following test procedures:

Calc. AD — Calculated apparent density is determined by measuring the volume occupied by the powder comprising 1 cm$^3$ of pore-free polymer contained in the specimen tube used for the subsieve size test. This volume is termed the bulk factor. Calc. AD = 2285/bulk factor. The units of apparent density are grams/liter. The value obtained in this measurement is always close to but not necessarily identical with the value for apparent density as measured by the procedure of ASTM 1457. The reason for use of calc. AD rather than the ASTM procedure is the requirement for 2.285 grams of sample rather than a quantity that may be as large as 200 grams.

Specific Surface Area (SSA) — The specific surface area of a sample of powder is the number of square meters of surface per gram of polymer as measured by a nitrogen adsorption technique. The measurements of this parameter were all made using a modified gas chromatographic technique with the instrument being calibrated for each run with a sample of polytetrafluoroethylene on which the surface area was measured using the standard BET procedure described by Barr and Anhorn in Chapter XII of "Scientific and Industrial Glassblowing and Laboratory Techniques" published in 1949 by Instrument Publishing Company. All of the molding powders of the present invention prepared in the Examples herein have an SSA of at least 1.5 m$^2$/g. PTFE fine powder as a starting material has an SSA of at least 9 m$^2$/g, and after the compaction and decompaction steps, the SSA is still well above 1.5 m$^2$/g.

Subsieve Size (SSS) — This is a number expressed in microns determined on an apparatus made by the Fisher Scientific Company and called a subsieve sizer. The procedure is essentially that described in ASTM Standard B-330-58T using a porosity value in the determination of 0.55 using a sample size for unfilled resin of 2.28 grams. SSS is a measure of air permeability, which is a function of particle size and porosity. For series of samples in which porosity does not vary, SSS is a measure of average particle size. SSG — The standard specific gravity is measured on samples preformed at 5000 psi (or 352 kg/cm$^2$).

The test procedure is described in ASTM D 1457-69, except that the preforming die used is 2.86 cm in diameter and a charge of 12.0 g of polymer is used. The sintering cycle includes a step of heating up the specimen from 300° to 380°C. at 2°c/min. After the specified 30 minutes at 380°C. the oven is cooled to 295°C. at 1°C. per minute and held at this temperature for 25 minutes after which the specimen is removed and cooled to room temperature and the standard specific gravity is determined as specified in D 1457-69. SG (1000) means that the SSG procedure was followed except that the specific gravity is determined on a sintered preform molded at 1000 psi instead of 5000 psi. SSG increases with the rate of crystallization, and (for homopolymers at least) rate of crystallization decreases with increasing molecular weight. Thus SSG measurements before and after a process give a measure of molecular weight change due to that process.

$\Delta SG_{5-1}$ — Delta specific gravity (moldability index 5-1) involves determination of the specific gravity of a sintered specimen prepared as in the SSG procedure except that the preform pressure used is 1000 psi (70 kg/cm$^2$). $\Delta SG_{5-1}$ = 1000 (SSG (5000 psi preform pressure) — SG (1000 psi preform pressure)). When the term moldability index is used for $\Delta SG_{5-2}$, such moldability index is defined as 1000 × (difference between the specific gravity of moldings made at 5000 and 2000 psi preform pressures).

% S (5000) — The percent shrinkage is the percent decrease in diameter between the preform and final sintered piece of the test specimen used to determine SSG with the measurement being carried out in the direction perpendicular to the direction of applied preform pressures (lateral change). A value obtained for % S varies appreciably with preform pressure and even with details of application of the preform pressure. % S (1000) is the same with a preform pressure of 1000 psi (70 kg/cm$^2$) instead of 5000 psi. (352 kg/cm$^2$). (S) is the symbol used for a constant in an equation used to predict lateral and axial dimensional changes during sintering. (S) is a measure of the elastic memory or fibrousness of the polymer particles and has been shown experimentally to be essentially constant with preform pressure rather than varying widely as does percent shrinkage. If one knows the void volume of a preform it is possible to calculate dimensional changes in both the axial and lateral direction of a molding by using (S) according to the equations 2a and 2b below. The value of (S) is determined from %S as shown in equation 3 below, using a preform pressure of 352 kg/cm$^2$. The closer (S) is to zero, the more isotropic is the behavior of the sample.

Eq. 2a — calculate lateral change
% shrinkage = 100 $\{1 - [\sqrt[3]{(\text{preform density/sintered density})} \times [1 + 0.01 \, (S)] \times (0.9667 + 0.1025 \, \psi_G - 0.0844 \, \psi_G^2)]\}$ where $\psi_G$ = Void fraction of the preform. To a good approximation $\psi_G = 1 - (\text{preform density}/2.285)$ Eq. 2b — calculate axial change
% growth = 100 $\{[\sqrt[3]{(\text{preform density/sintered density})} \times [1/(1 + 0.01 \, (S))^2] \times (1.069 - 0.224 \, \psi_G + 0.1979 \, \psi_G^2)] - 1\}$ Eq. 3 — calculate (S) — measure of elastic memory of particles in mold
(S) = 100 $\{[1 + 0.01 \, (\%S)]/[\sqrt[3]{(\text{preform density/sintered density})} \times (0.9667 + 0.1025 \, \psi_G - 0.0844 \, \psi_G^2)] - 1\}$ Porosity — The porosity is the void fraction in cm$^3$ voids/cm$^2$ total volume of the preform used to prepare the specimen for the SG (1000) determination as defined above. It is indicative of the preformability of a resin.

Tensile Strength — is the stress at rupture in kg/cm$^2$ of original cross-sectional area of a tensile strength test specimen of the dimensions specified in ASTM D-1457-69 preformed at 5000 psi (or 352 kg/cm$^2$) and sintered according to the schedule described under SSG, unless otherwise specified.

AEF (anisotropic expansion factor) is a measure of the dimensional change obtained on sintering. The value is obtained as follows: Twelve grams of powder is weighed into a 1⅛ inches (2.86 cm) diameter mold and compressed to 352 kg/cm$^2$ during 1 minute, held for 2 minutes, and then released. The diameter and height of the preform are measured and the preform is sintered by the same sintering cycle as under SSG. The sintered thickness and diameter are then obtained and anisotropic expansion factor is then the value of $$T_s/T_p \div D_s/D_p$$

when $T_s$ and $T_p$ are thickness of sintered resin and preform, respectively.

when $D_s$ and $D_p$ are diameter of sintered piece and preform, respectively. % E — is the percent elongation of the Tensile Strength (TS) test specimen at rupture.

Powder Flow — The polymer sample is used to fill a vertical polytetrafluoroethylene pipe 22.8 cm high and 5.08 cm in diameter and having a 6 mesh screen attached across the base of the pipe. The pipe is subjected to vibration having a frequency of 675 cycles/minute and an amplitude of 0.762 cm. The amount of powder flowing through the screen is continuously weighed and recorded. From the resulting curve the powder flow is calculated as grams/second.

Particle size disclosed herein unless otherwise specified is the weight average particle diameter ($d_{50}$) of the molding powder determined by the wet sieve procedure disclosed in U.S. Pat. No. 2,936,301. Standard sieves for wet sieve analysis are not readily available in sizes smaller than 37 microns and the wet sieve method is not applicable to very small particles. The weight average particle diameter of particles smaller than 37 microns is determined by the "Micromerograph" method described in U.S. Pat. No. 3,265,679, unless otherwise indicated herein. Results from Micromerograph determinations are in units of $d$ (microns) × $\sqrt{\text{rho}}$ where rho is the density of the particle. This density is not known but is believed to vary with particle size and type (alpha or beta resin). The density is expected to vary from about 0.8 to 2.28. The corresponding square root values vary from about 0.9 to 1.5 and the actual average size is microns, therefore, is usually somewhat less than the value of $d$ $\sqrt{\text{rho}}$ reported. In most instances, particle size values obtained by one of these tests were conformed qualitatively by optical microscopy.

The average particle diamater, $d_{50}$, of agglomerated powders is determined by the wet sieving procedure of ASTM D-1457-69, but selecting a set of sieves in the square root of 2 series starting with 1000 microns recommended by the International Standards Organization. The particle size of the basic or primary particles of PTFE fine powder is determined by observation through an electron microscope.

Apparent melt viscosity is calculated by measuring the tensile creep of a sintered piece held at 380°C. Specifically, 12 g. of molding powder is plced in a 7.6 cm diameter mold between 0.152 cm rubber cauls and paper spacers. The mold is then heated at 100°C. for 1 hour. Pressure is then slowly applied on the mold until a value of 140.6 kg/cm² is obtained. This pressure is held for 5 minutes and then released slowly. After the sample disc is removed from the mold and separated from the cauls and paper spacers, it is sintered at 380°C for 30 minutes. The oven is then cooled to 290°C. at a rate of about 1°C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar oven where the 4 cm. test length is brought to a temperature of 380°±2°C. A weight is then attached to the bottom quartz rod to give a total weight suspended from the sample sliver of about 4 g. The elongation measurements vs. time are obtained, and the best average value for the creep curve in the interval between 30 and 60 minutes is measured. The specific melt viscosity, which may be better called apparent melt viscosity, is then calculated from the relationship $$\eta\ app = \frac{WL_{T}g}{3(dL_T/dt)A_T}$$

where
$\eta$ app = (apparent) melt viscosity in shear, poises
W = tensile load on sample, g
$L_T$ = length of sample (at 380°C.) cms. (4.32 cm)
g = gravitational constant, 980 cm./sec.²
$(dL_T/dt)$ = rate of elongation of sample under load = slope of elongation vs. time plot, cm./sec.
$A_T$ = cross-sectional area of sample (at 380°C.), cm² — area increases 37% at 380°C. over that at room temperature Examples of molding powders prepared in the present invention are as follows (parts and percents are by weight unless otherwise indicated:

EXAMPLES 1-12

These examples show the making of molding powder from various PTFE fine powder starting materials (Fine Powder E is used in Examples 19 and 24).

| Fine Powder | Description |
|---|---|
| A | PTFE homopolymer, SSG ca. 2.220 (U.S. Pat. No. 2,559,752) |
| B | PTFE modified by hexafluoropropylene (U.S. Pat. No. 3,142,665) |
| C | PTFE modified by hexafluoropropylene (lower mol wt. than A, U.S. Pat. No. 3,142,665) |
| D | PTFE modified by perfluoropropyl vinyl ether (Ser. No. 254,014, filed May 17, 1972) |
| E | PTFE homopolymer, SSG 2.167 |

All these starting materials were large agglomerates ($d_{50}$ 400–600 microns) of tiny basic particles (0.1 – 0.5 microns).

The starting fine powder (coagulated and dried aqueous dispersion PTFE) was compacted in a laboratory press at 25°C. and at various pressures. The mold was a cylinder 5.72 cm in diameter and the fine powder charge was 100 g.

The partial decompaction was accomplished in a 3.785 l. Waring Blendor (Model No. CB-5), a high-speed blade type mixing device, equipped with a 12.1 cm diameter blade, 6.35 mm wide and 3.17 mm thick leading edge, unless otherwise indicated. The broad faces of the blade move in a plane perpendicular to the vertical shaft. The resin particles are struck by the 3.17 mm thick, blunt leading edges of the blade as it rotates. During the finishing, temperature was measured with a thermocouple in the slurry and controlled by circulating ice water or hot water through the jacket of the blender. This apparatus was used at high speed for Examples 1–6, 10, 11, and 12, and their control experiments.

In some experiments, a standard blade supplied with the Waring Blendor (Examples 7, 8 and 9 and their control) was used in place of the flat blade. In other experiments, a 0.947 l. Waring Blendor was used with its standard blade (Example 6 and its control). The data tables show whether the high or low speed of the blender was used. It is estimated that with the 12.1 cm blade, the peripheral speed was 76.3 m/sec at high speed and 45.8 m/sec at low speed.

In each partial decompaction step, water at 30°C and the compacted fine powder cylinder were charged to the blender, enough water being used to give about 10–20% solids in the blender. The time of partial decompaction is shown for each experiment. The molding powder was separated and dried at 120°C. for 16 hours. Further details of these experiments and results are shown in Table I:

TABLE I

| Example | Fine Powder Starting Material | Compaction Pressure kg/cm² | Partial decompaction Min. | Speed | AD g/l | SSG | $\Delta SG_{5-1}$ | Porosity | AEF | %S(5000) | %S(1000) | (S) | SSS microns | $d_{50}$ microns |
|---|---|---|---|---|---|---|---|---|---|---|---|---|---|---|
| Control | A | — | — | H | 456 | 2.220 | 0.8 | 0.260 | 1.120 | 4.9 | 9.9 | −1.03 | — | — |
| 1 | A | 562 | 10 | H | 713 | 2.220 | 11.3 | 0.158 | 1.089 | 2.9 | 6.0 | 0.22 | 14 | — |
| Control | B | — | — | H | 518 | 2.169 | 1.7 | 0.272 | 1.121 | 4.4 | 9.8 | — | — | — |
| 2 | B | 562 | 10 | H | 814 | 2.170 | 24.8 | 0.162 | 1.088 | 2.5 | 5.3 | 0.14 | 9.8 | — |
| Control | C | — | — | H | 495 | 2.223 | 1.2 | 0.294 | 1.120 | 5.1 | 10.6 | — | — | — |
| 3 | C | 562 | 10 | H | 760 | 2.221 | 50.6 | 0.166 | 1.094 | 3.4 | 5.6 | −0.03 | 11 | — |
| Control | D | — | — | H | 456 | 2.168 | 0.8 | 0.281 | 1.122 | 4.3 | 10.1 | — | — | — |
| 4 | D | 562 | 10 | H | 713 | 2.167 | 52.8 | 0.196 | 1.09 | 2.8 | 5.8 | −0.04 | 8.5 | — |

TABLE I-continued

| Example | Fine Powder Starting Material | Compaction Pressure kg/cm² | Partial decompaction Min. | Partial decompaction Speed | AD g/l | SSG | ΔSG$_{5-1}$ | Porosity | AEF | %S(5000) | %S(1000) | (S) | SSS microns | d$_{50}$ microns |
|---|---|---|---|---|---|---|---|---|---|---|---|---|---|---|
| Control | A | — | — | H | 506 | 2.222 | 0.7 | 0.256 | 1.170 | 5.6 | 10.2 | −2.26 | 3.0 | — |
| 5 | A | 528 | 10 | H | 671 | 2.222 | 16.3 | 0.151 | 1.103 | 3.2 | 6.1 | −0.16 | 12 | — |
| Control | A | — | — | H | 530 | 2.219 | 0.5 | 0.243 | 1.153 | 5.5 | 9.8 | — | — | — |
| 6 | A | 562 | 2 | H | 814 | 2.218 | 50.7 | 0.145 | 1.085 | 3.0 | 5.0 | 0.27 | 20 | 66.1 |
| 7 | A | 562 | 1 | L | 877 | 2.217 | 58.6 | 0.146 | 1.089 | 3.1 | 4.9 | 0.15 | 22 | 63.2 |
| 8 | A | 562 | 10 | L | 786 | 2.221 | 9.4 | 0.149 | 1.094 | 3.2 | 5.9 | 0.03 | 11 | 32.6 |
| 9 | A | 562 | 12 | H | 760 | 2.222 | 5.4 | 0.151 | 1.096 | 3.5 | 6.3 | −0.10 | 7.2 | 28.9 |
| 10 | A | 562 | 1 | L | 760 | 2.221 | 15.1 | 0.146 | 1.096 | 3.4 | 5.8 | −0.08 | 12 | 33.2 |
| 11 | A | 562 | 10 | L | 786 | 2.222 | 5.5 | 0.147 | 1.100 | 3.5 | 6.2 | −0.19 | 7.8 | — |
| 12 | A | 562 | 12 | H | 671 | 2.221 | 0 | 0.155 | 1.110 | 3.6 | 6.3 | −0.44 | 4.9 | 27.1 |

The fine powder starting materials A, B, C and D all exhibit low ΔSG$_{5-1}$ values, but these materials are not fabricable by molding powder techniques because of the tendency of the fine powder to stick to the preform mold and of the preform of the fine powder to crack upon sintering. This poor molding quality is caused by the high porosity (greater than 0.24) of preforms of the fine powder, high shrinkage of the sintered fine powder (% S$_{1000}$ greater than 9.0) and high (S) absolute value of greater than 1.0.

On the other hand, the Examples shown in Table I are good to excellent molding powders, having low preform porosity of less than 0.20, in most cases less than 0.17, and in many cases less than 0.15, (S) absolute value less than 0.8, and smaller AEF. In addition, these molding powders all have a considerably higher apparent density than prior art finely ground molding powders. Examples 6–12, which are conducted under different partial decompaction conditions, show generally that the more vigorous or extensive the decompaction is, the smaller is the ΔSG$_{5-1}$ value (improved moldability).

EXAMPLES 13 and 14

These Examples show the effect in Table II of varying compaction pressure in the procedure used for Example 1, using fine powder A as the starting material.

TABLE II

|  | Control | Comparison A | Example 13 | Example 14 |
|---|---|---|---|---|
| Compaction pressure (kg/cm²) | — | 211 | 352 | 562 |
| Decompaction time (min) | — | 10 | 10 | 10 |
| AD - g/l | 530 | 393 | 543 | 651 |
| SSG | 2.219 | 2.225 | 2.224 | 2.223 |
| ΔSG$_{5-1}$ | 0.5 | 2.7 | 2.2 | 0.6 |
| Porosity | 0.243 | 0.184 | 0.165 | 0.150 |
| AEF | 1.153 | 1.120 | 1.111 | 1.108 |
| % S (5000) | 5.5 | 4.3 | 3.8 | 3.5 |
| % S (1000) | 9.8 | 7.9 | 7.1 | 6.4 |
| SSS - microns | — | 2.3 | 4.1 | 6.0 |
| (S) | −1.90 | −0.85 | −0.50 | −0.35 |

Comparison molding powder A, which is not a prior art molding powder, is inferior because of its low apparent density. As the compaction pressure increases to 352 kg/cm² and then to greater than 562 kg/cm², apparent density increases, moldability improves and improvements in such properties as porosity and anisotropic expansion are obtained.

EXAMPLES 15 and 16

These Examples show in Table III the effect of varying partial decompaction temperature in the procedure used for Example 1 using fine powder D as the starting material.

TABLE III

|  | Control | Comparison B | Example 15 | Example 16 |
|---|---|---|---|---|
| Compaction: |  |  |  |  |
| kg/cm² | — | 562 | 562 | 562 |
| T°C. | — | 25 | 25 | 25 |
| Decompaction - °C. | — | 80 | 7 | 35 |
| min. | — | 12 | 12 | 12 |
| AD - g/l | 375 | 450 | 550 | 550 |
| SSG | 2.172 | 2.179 | 2.180 | 2.179 |
| ΔSG$_{5-1}$ | 1.4 | 2.6 | 13.6 | 9.4 |
| Porosity | 0.247 | 0.182 | 0.163 | 0.166 |
| AEF | 1.138 | 1.121 | 1.086 | 1.106 |
| % S (5000) | 4.3 | 3.3 | 2.5 | 3.1 |
| % S (1000) | 9.1 | 6.9 | 5.5 | 6.2 |
| SSS - microns | — | 4.1 | 6.0 | 5.2 |
| (S) | −1.44 | −0.76 | 0.23 | −0.38 |

These experiments show that various decompaction temperatures can be used. In the case of Comparison B molding powder, a higher compaction pressure or shorter decompaction time would provide higher AD molding powder upon partial decompaction.

EXAMPLES 17 and 18

In these Examples, the procedure of Example 1 was repeated except as indicated in Table IV below and except that after coagulation the fine powder was not dried so that at the time of compaction, the fine powder A contained 30% by weight of water.

TABLE IV

|  | Control | Ex. 17 | Ex. 18 |
|---|---|---|---|
| Compaction kg/cm$^2$ | — | 528 | 528 |
| Decompaction time (min) | — | 4 | 10 |
| AD - g/l | 506 | 713 | 671 |
| SSG | 2.222 | 2.219 | 2.220 |
| $\Delta SG_{5-1}$ | 0.7 | 18.5 | 2.2 |
| Porosity | 0.256 | 0.168 | 0.175 |
| AEF | 1.170 | 1.108 | 1.124 |
| % S (5000) | 5.6 | 3.6 | 3.7 |
| % S (1000) | 10.2 | 6.4 | 6.9 |
| SSS microns | 3.0 | 16 | 6.5 |
| (S) | −2.26 | −0.40 | −0.76 |

EXAMPLES 19–21

These examples show that it is not necessary to use a Waring Blendor for partial decompaction. In these experiments, each fine powder starting material is compacted in a press at 562 kg/cm$^2$ pressure at 25°C. Type E is the fine powder used for Example 19 and Type D is the fine powder used for Examples 20 and 21. The compacted fine powder Type E for Example 19 and Type D for Examples 20 and 21 were each mixed with water and fed continuously to a Taylor-Stiles cutter, Model TS-06, with 15.2 cm rotor blades, operating at a rotor speed of 9600 rpm and equipped with a screen across the discharge of the cutter. For Examples 19 and 20, the screen was a 30P screen (manufacturer's designation) in which the screen has a thickness of 0.21 mm, a minimum hole diameter of 0.33 mm and 14.5 percent open area. The hole has a profile starting at about 0.83 microns on one surface of the screen and then decreasing to the minimum indicated at the opposite side. For Example 21 the screen was a 60R VERO screen (manufacturer's designation). This screen has a thickness of 0.20 mm with a minimum hole diameter of 0.13 mm and 8 percent open area. The holes have a rounded profile going from about 0.42 mm diameter at one surface to the minimum given above and then increasing again to the other surface. The feed slurry at 8°C. was passed through the cutter at a water flow rate of 1360 liters/hour and polymer feed rate of 22.7 kilograms/hour.

The product was separated from the water by flotation, diluted with ten parts of fresh water and agitated in a slurry tank for 30 minutes at room temperature according to U.S. Pat. No. 3,690,569. The slurry tank was equipped with vertical baffles to increase turbulence and jacketed to control the temperature. The tank had a diameter of 45.7 cm and a height of 45.7 cm. The agitator blades were rectangular and four in number, each measuring 22.9 cm in diameter and 5.1 cm in height, with a 45° pitch. The agitator speed was 400 rpm. Further details and results of these experiments are shown in Table V:

TABLE V

|  | Control for Example 19 (No compaction or decompaction) | Ex. 19 | Control for Examples 20 & 21 (No compaction or decompaction) | Ex. 20 | Ex. 21 |
|---|---|---|---|---|---|
| AD-g/l | 600 | 650 | 518 | 713 | 585 |
| SSG | 2.166 | 2.168 | 2.155 | 2.155 | 2.157 |
| $\Delta SG_{5-1}$ | 0.3 | 16.6 | 0.9 | 47.6 | 2.2 |
| Porosity | 0.251 | 0.160 | 0.267 | 0.182 | 0.197 |
| AEF | 1.139 | 1.094 | 1.150 | 1.089 | 1.105 |
| % S (5000) | 4.3 | 2.5 | 4.2 | 2.5 | 3.1 |
| % S (1000) | 9.2 | 5.5 | 9.8 | 5.3 | 7.0 |
| SSS-microns | — | 5.9 | — | 7.2 | 3.1 |
| (S) | −1.48 | 0 | −1.73 | 0.06 | −0.46 |

While the control fine powders in the Table exhibit high apparent density and low $\Delta SG_{5-1}$, these fine powders are not moldable by the usual molding powder fabrication techniques, due in part to the sticky nature of the fine powder type of PTFE and in part to the high (S) value and porosity thereof. The molding powders obtained from these fine powders are moldable like PTFE molding powder.

EXAMPLES 22 and 23

These examples show in Table VI that with the same feed resin (fine powder A), comparable results can be obtained by Waring Blendor partial decompaction after 562 kg/cm$^2$ precompaction (Example 22) and Taylor-Stiles partial decompaction followed by aqueous agitation, following precompaction at 1760 kg/cm$^2$ (Example 23).

TABLE VI

|  | Ex. 22 (Same as Ex. 1) | Ex. 23 |
|---|---|---|
| Compaction kg/cm$^2$ | 562 | 1760 |
| temp. °C. | 25 | 25 |
| Decompaction | Waring Blendor 10 min. at 30°C. | Taylor-Stiles plus cold water wash |
| AD-g/l. | 713 | 620 |
| SSG | 2.220 | 2.226 |
| $\Delta SG_{5-1}$ | 11.3 | 1.2 |
| Porosity | 0.158 | 0.152 |
| AEF | 1.089 | 1.101 |
| % S(5000) | 2.9 | 3.4 |
| % S(1000) | 6.0 | 6.2 |
| SSS-microns | 14 | 0.2 |
| (S) | −0.22 | −0.16 |

EXAMPLES 24 and 25

These examples show in Table VII that the precompacted fine powder can be partially decompacted by air grinding rather than decompacting under water. A 20.3 cm fluid energy mill was used, as described in U.S. Pat. No. 3,726,484. The precompacted resin was broken up in a shredder through a screen having 6.35 mm apertures so the resin could be fed to the air mill.

TABLE VII

|  | Ex. 24 | Ex. 25 |
|---|---|---|
| Fine Powder starting material | E | B |

TABLE VII-continued

|  | Ex. 24 | Ex. 25 |
|---|---|---|
| Compaction pressure, kg/cm² | 562 | 3515 |
| Compaction temperature, °C | 25 | 25 |
| Fluid energy mill feed rate, kg/hr | 31.1 | 70.5 |
| air inlet pressure, kg/cm² | 7.03 | 7.6 |
| feed air pressure, kg/cm² | 7.74 | 7.74 |
| air flow, l/m | 2830 | 2830 |
| feed air temperature, °C. | ca25 | ca25 |
| Product AD-g/l. | 671 | 750 |
| SSG | 2.169 | 2.1834 |
| $\Delta SG_{5-1}$ | 4.5 | 3 |
| Porosity | 0.163 | 0.174 |
| AEF | 1.103 | 1.1 |
| % S (5000) | 2.7 | 2.9 |
| % S (1000) | 5.9 | 6.8 |
| SSS, microns | — | 12.1 |
| (S) | −0.03 | −0.19 |

EXAMPLE 26

In this Example, a series of compactions was carried out at 562 kg/cm² pressure and at 25°C. using fine powder A and partial decompaction was done to a varying degree to obtain the following data for the resultant molding powder of this invention.

| $d_{50}$ microns | $\Delta SG_{5-1}$ |
|---|---|
| 66 | 51 |
| 63 | 57 |
| 33 | 9.4 |
| 29 | 5.4 |
| 27 | 0 |

This data shows the general relationship of increasing moldability with decreasing particle size. The correlation between larger average particle diameters and moldability index is as follows: at $d_{50}$ of 206 microns, $\Delta SG_{5-1}$ of 168; at $d_{50}$ of 170 microns, $\Delta SG_{5-1}$ of 147; at $d_{50}$ of 90 microns, $\Delta SG_{5-1}$ of 115. From this data it is possible to determine $d_{50}$ particle size from the determination of $\Delta SG_{5-1}$ on the molding powder. For example, at $\Delta SG_{5-1}$ of from 0 to 75 which encompasses Examples 1–25 herein, the $d_{50}$ particle size of the molding powders is from about 30 to 70 microns.

EXAMPLE 27 — Agglomeration

Typical molding powder derived from fine powder A was agglomerated in the 45.7 cm stirred tank of Examples 19–21. The charge was 4.54 kg polymer, 38.14 kg water, and 1200 cc tetrachloroethylene. It was agitated at 860 rpm for 30 minutes at 25°C. The product, after separation and drying, had good sinterability and excellent AD and powder flow as shown by the following properties.

| Calc AD-g/l | 875 |
|---|---|
| Powder flow, g/sec | 31 |
| SSG | 2.217 |
| $\Delta SG_{5-1}$ | 30 |
| % S (5000) | 3.18 |
| $d_{50}$-microns (Av. agglom.size) | 590 |
| Tensile strength/elongation, kg/cm²/% | |
| 70 kg/cm² preform pressure | 167/227 |
| 141 kg/cm² preform pressure | 204/326 |
| 352 kg/cm² preform pressure | 245/453 |

EXAMPLE 28 — Agglomeration

Using the same equipment as in Example 27, an experiment was conducted charging 6.82 kg of product made by partial decompaction of compacted Resin F, 38.1 kg water, and 3000 ml tetrachloroethylene. The mixture was stirred at 860 rpm for 30 minutes at 25°C., separated, and dried. Following are its properties:

| Calc AD-g/l | 830 |
|---|---|
| Powder flow g/sec | 28 |
| SSG | 2.175 |
| $\Delta SG_{5-1}$ | 40 |
| % S (5000) | 2.92 |
| $d_{50}$-microns (Av. agglom. size) | 225 |
| Tensile strength/elongation, kg/cm²/% | |
| 70.3 kg/cm² preform pressure | 198/292 |
| 140.6 kg/cm² preform pressure | 255/316 |
| 352 kg/cm² preform pressure | 280/374 |

What is claimed is:

1. A process for making polytetrafluoroethylene molding powder from polytetrafluoroethylene fine powder obtained from aqueous dispersion polymerization comprising compacting said fine powder at a temperature of about 20° to 30°C. at a pressure of 8000 psi to 50,000 psi and partially decompacting the resultant compact to said molding powder having an average diameter of less than 100 microns.

2. The process of claim 1 wherein the average particle diameter is at least 10 microns.

3. the process of claim 1 wherein said molding powder has a preform porosity at 1000 psi (70 kg/cm²) preform pressure of no greater than 0.20.

4. The process of claim 1 wherein said molding powder has an apparent density of at least 500 g/l, with the proviso that the apparent density is at least as great as the value calculated from the equation $$\text{apparent density} \quad 500 \text{ g/l} + 3 \ (\Delta SG_{5-1})$$

wherein $\Delta SG_{5-1}$ is 1000 times the difference in specific gravities of sintered moldings made at preform pressures of 1000 psi (70 kg/cm²) and 5000 psi (352 kg/cm²) wherein said $\Delta SG_{5-1}$ is no greater than 75.

5. The process of claim 1 wherein said partial decompaction is done by decompacting in gas.

6. The process of claim 1 wherein said partial decompaction is done by decompacting in liquid.

* * * * *